(12) United States Patent
Zhou et al.

(10) Patent No.: US 12,160,643 B2
(45) Date of Patent: Dec. 3, 2024

(54) VIDEO GENERATION METHOD AND APPARATUS, AND DEVICE, MEDIUM AND PRODUCT

(71) Applicant: Beijing Youzhuju Network Technology Co., Ltd., Beijing (CN)

(72) Inventors: Wen Zhou, Beijing (CN); Fan Zhang, Beijing (CN); Ya Li, Beijing (CN); Chen Du, Beijing (CN); Rongchang Xie, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/393,567

(22) Filed: Dec. 21, 2023

(65) Prior Publication Data
US 2024/0147023 A1 May 2, 2024

Related U.S. Application Data

(63) Continuation of application No. PCT/CN2023/070291, filed on Jan. 4, 2023.

(30) Foreign Application Priority Data

Jan. 29, 2022 (CN) .......................... 202210111702.1

(51) Int. Cl.
*H04N 21/81* (2011.01)
*G06V 40/20* (2022.01)
*H04N 21/234* (2011.01)

(52) U.S. Cl.
CPC ........... *H04N 21/816* (2013.01); *G06V 40/20* (2022.01); *H04N 21/23424* (2013.01)

(58) Field of Classification Search
CPC ......... H04N 21/8456; H04N 21/44008; H04N 21/44016; H04N 21/8549;
(Continued)

(56) References Cited

U.S. PATENT DOCUMENTS 10,178,422 B1 * 1/2019 Panchaksharaiah ... G11B 27/00
10,860,860 B1 * 12/2020 Huynh .................. G06F 16/739
(Continued)

FOREIGN PATENT DOCUMENTS

CN 109874029 A 6/2019
CN 111683209 A 9/2020
(Continued)

*Primary Examiner* — Jason Salce
(74) *Attorney, Agent, or Firm* — Astute IP Law Group

(57) ABSTRACT

The present disclosure provides a video generation method and apparatus, a device, and a medium and a product, and relates to the technical field of computers. The method includes: acquiring description information of a target video to be generated; according to the description information of the target video, acquiring, from a video material library, a target clip corresponding to the description information; splicing the target clip with each candidate clip of a plurality of candidate clips in the video material library respectively to obtain a plurality of candidate videos; evaluating a score of each candidate video of the plurality of candidate videos; and generating the target video according to the score of each candidate video of the plurality of candidate videos.

20 Claims, 4 Drawing Sheets

(58) Field of Classification Search
CPC ......... H04N 21/23424; H04N 21/4532; H04N 21/84; H04N 21/23418
See application file for complete search history.

(56) References Cited

U.S. PATENT DOCUMENTS

| | | | |
|---|---|---|---|
| 11,310,559 B2* | 4/2022 | Jiang | H04N 21/47202 |
| 2006/0015925 A1* | 1/2006 | Logan | H04N 21/84 |
| | | | 348/E7.071 |
| 2008/0002776 A1* | 1/2008 | Borer | H04N 21/6587 |
| | | | 375/240.26 |
| 2009/0187939 A1* | 7/2009 | Lajoie | H04N 7/17318 |
| | | | 725/87 |
| 2019/0188479 A1 | 6/2019 | Balasubramanian et al. | |
| 2020/0320307 A1 | 10/2020 | Tian et al. | |
| 2021/0264446 A1 | 8/2021 | Wang et al. | |
| 2022/0358966 A1* | 11/2022 | Wang | G11B 27/036 |

FOREIGN PATENT DOCUMENTS

| | | | |
|---|---|---|---|
| CN | 112004163 A | 11/2020 | |
| CN | 112784078 A | 5/2021 | |
| CN | 113038149 A | 6/2021 | |
| CN | 113259754 A | 8/2021 | |
| CN | 114501064 A | 5/2022 | |

* cited by examiner

VIDEO GENERATION METHOD AND APPARATUS, AND DEVICE, MEDIUM AND PRODUCT

CROSS REFERENCE TO RELATED APPLICATIONS

The present application is a continuation of International Patent Application No. PCT/CN2023/070291, filed on Jan. 4, 2023, which claims priority of Chinese Patent Application No. 202210111702.1, filed on Jan. 29, 2022. All the aforementioned patent applications are hereby incorporated by reference in their entireties.

TECHNICAL FIELD

The present disclosure relates to the technical field of computers, and in particular to a video generation method and apparatus, a device, a computer-readable storage medium and a computer program product.

BACKGROUND

With the continuous development of computer technology, especially mobile Internet technology, various applications (APPs) have emerged. Taking a video application as an example, users may publish videos based on this video application, and users may also watch videos published by other users based on this video application.

In a process of creating a video, the user needs to shoot an original video first, and edit, splice and dub the original video to finally obtain the complete video. It can be seen that in the process of creating the video described above, the user needs to perform complicated operations, and the difficulty of creating the video is high.

SUMMARY

The present disclosure aims to provide a video generation method and apparatus, a device, a computer-readable storage medium and a computer program product, which can automatically create a video, simplify operation of users and reduce the difficulty of creating the video.

According to a first aspect of the present disclosure, a video generation method is provided. The method includes:
  acquiring description information of a target video to be generated;
  acquiring, from a plurality of video clips in a video material library, a target clip corresponding to the description information according to the description information of the target video, wherein the plurality of video clips have corresponding description information;
  determining a plurality of candidate clips based on the target clip and the plurality of video clips;
  splicing the target clip with each candidate clip of the plurality of candidate clips respectively to obtain a plurality of candidate videos;
  evaluating a score of each candidate video of the plurality of candidate videos; and
  generating the target video according to the score of each candidate video of the plurality of candidate videos.

According to a second aspect of the present disclosure, a video generation apparatus is provided. The apparatus includes:
  an acquisition module, configured to: acquire description information of a target video to be generated; acquire, from a plurality of video clips in a video material library, a target clip corresponding to the description information according to the description information of the target video, the plurality of video clips having corresponding description information; and determine a plurality of candidate clips based on the target clip and the plurality of video clips;
  a splicing module, configured to splice the target clip with each candidate clip of the plurality of candidate clips respectively to obtain a plurality of candidate videos;
  an evaluation module, configured to evaluate a score of each candidate video of the plurality of candidate videos; and
  a generation module, configured to generate the target video according to the score of each candidate video of the plurality of candidate videos.

According to a third aspect of the present disclosure, a computer-readable medium is provided. The computer-readable medium stores a computer program, and when the computer program is executed by a processing apparatus, steps of the method described in any one of the first aspect of the present disclosure are implemented.

According to a fourth aspect of the present disclosure, an electronic device is provided. The electronic device includes:
  a storage apparatus storing a computer program; and
  a processing apparatus, configured to execute the computer program on the storage apparatus to implement steps of the method in any one of the first aspect of the present disclosure.

According to a fifth aspect of the present disclosure, a computer program product with an instruction is provided. When the computer program product is run on a device, the device performs the method described in any one of the above-mentioned first aspect.

As can be seen from the above technical solution, the present disclosure has the following advantages.

The present disclosure provides a video generation method, including: firstly, acquiring the description information of a target video to be generated; then acquiring, from a video material library, a target clip corresponding to the description information based on the description information of the target video; and splicing the target clip with each candidate clip of a plurality of candidate clips in the video material library, thereby obtaining a plurality of candidate videos; then, evaluating the plurality of candidate videos respectively to obtain a score of each candidate video of the plurality of candidate videos, and obtaining the target video based on the scores. For example, the candidate videos with the top 3 scores may be used as the target videos. It can be seen that in this method, the target video can be generated without complicated operations by the user such as editing and splicing the original video, so that the operations of the user are simplified and the difficulty of creating the video is reduced.

Other features and advantages of the present disclosure will be described in detail in the following detailed description.

BRIEF DESCRIPTION OF THE DRAWINGS

In order to explain technical methods of embodiments of the present disclosure more clearly, the drawings needed in the embodiments will be briefly introduced below.

DETAILED DESCRIPTION

Figure 1:
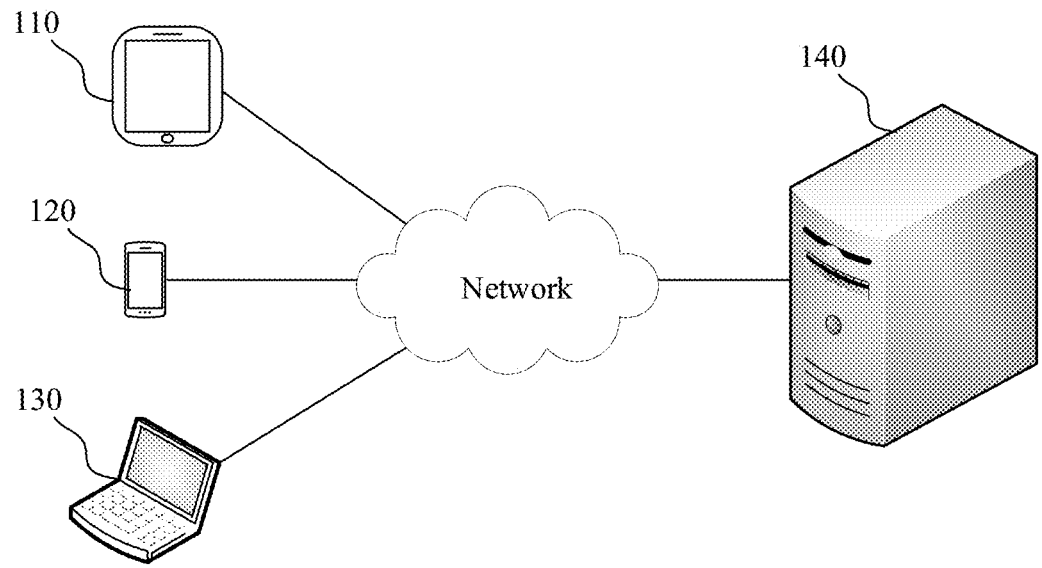
FIG. 1 is a schematic diagram of a video generation system provided by an embodiment of the present disclosure.

The terms "first" and "second" in the embodiment of the present disclosure are only used for descriptive purposes, and cannot be understood as indicating or implying relative importance or implicitly indicating the number of indicated technical features. Therefore, the features defined as "first" and "second" may include one or more of these features explicitly or implicitly.

Some technical terms referred to in the embodiments of the present disclosure will be first described.

As one of entertainment applications, a video application can provide a user with functions such as publishing and playing videos. When making a high-quality video (for example, a video with a high amount of play and a high completion rate), the user need to shoot an original video first, and then edit, splice and dub the original video to finally obtain the above-mentioned complete video.

It can be seen that in the process of creating the video described above, the user needs to perform complicated operations, and the difficulty of creating the video is high. Moreover, the uncertainty of the video obtained after the user manually clips the original video and the like is also high, for example, the needs of the user cannot be satisfied, which leads to poor amount of play and low completion rate, thus discouraging the user from creating the video again.

In view of this, an embodiment of the present disclosure provides a video generation method. The method includes: acquiring description information of a target video to be generated; acquiring a target clip corresponding to the description information from a video material library according to the description information of the target video; then splicing the target clip with each candidate clip of a plurality of candidate clips in the video material library respectively to obtain a plurality of candidate videos; evaluating a score of each candidate video of the plurality of candidate videos; and finally generating the target video according to the score of each candidate video of the plurality of candidate videos. For example, the candidate videos with the top 3 scores may be used as target videos.

It can be seen that in this method, the target video can be generated without complicated operations by the user such as editing and splicing the original video, so that the operations of the user are simplified and the difficulty of creating the video is reduced. Furthermore, the higher the score is, the higher the amount of play and the higher the completion rate of the candidate video are, so that the needs of the user are satisfied and the enthusiasm of the user for creating the video is improved.

This method may be applied to a video generation system. When this method is applied to the video generation system, it is specifically implemented in a form of a computer program. In some embodiments, the computer program may be independent, for example, it may be an independent application with corresponding functions. In other embodiments, the computer program may be a functional module, a plug-in, etc., which is attached to an existing application to run.

For example, if the video generation system is attached to a short video application (a type of video application), the video generation system may automatically generate a target video based on description information of the target video, wherein, the description information of the target video may be description information inputted by the user, or may be generated randomly or based on historical description information (for example, when the user does not input the description information of the target video). In this way, the operations of creating the video by the user are simplified, the difficulty of creating the video by the user is reduced, and the enthusiasm of the user for creating the video is improved.

The video generation method provided by an embodiment of the present disclosure may be executed by a terminal alone, a server alone, or both the terminal and the server cooperatively. When the video generation method is executed by the terminal alone, it indicates that the video generation system may run offline. In order to facilitate understanding, the video generation method is illustrated below as being executed by both the terminal and the server cooperatively.

In order to make the technical solution of the present disclosure clearer and easier to understand, an architecture of the video generation system provided by the embodiment of the present disclosure will be introduced with the attached drawings.

With reference to a system architecture diagram of a video generation system 100 shown in FIG. 1, the video generation system 100 includes a terminal 110, a terminal 120, a terminal 130 and a server 140. The terminal 110, the terminal 120 and the server 140 are connected through a network. The terminal 110 may be a terminal of a video creator (such as a target user), the terminal 120 may be a terminal of a small number of video viewers (such as a first user range), and the terminal 130 may be a terminal of a large number of video viewers (such as a second user range).The terminal includes but is not limited to a smartphone, a tablet computer, a notebook computer, a personal digital assistant (PDA) or a smart wearable device. The server 140 may be a cloud server, such as a central server in a central cloud computing cluster or an edge server in an edge cloud computing cluster. Certainly, the server 140 may also be a server in a local data center. The local data center refers to a data center directly controlled by a user.

Figure 2:
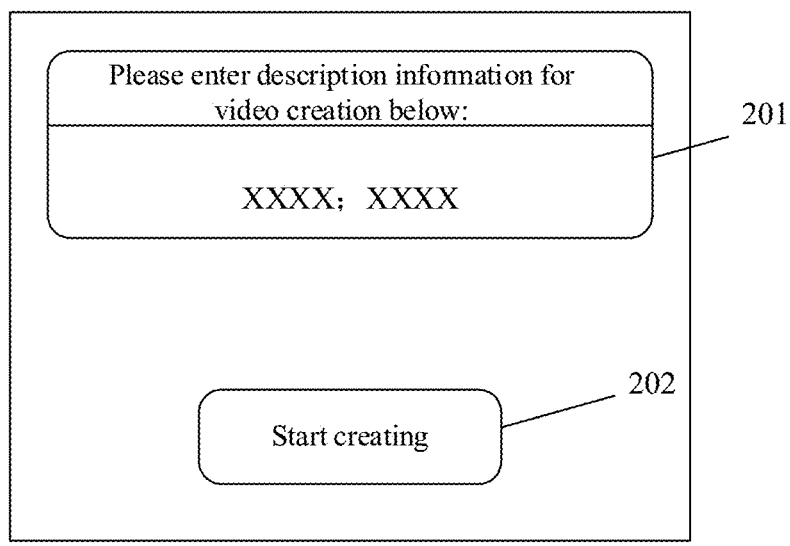
FIG. 2 is a schematic diagram of a video creation interface provided by an embodiment of the present disclosure.

In some examples, the terminal 110 may present a human-computer interaction interface to a target user so that the target user can create a target video. As shown in FIG. 2, this diagram is a schematic diagram of a video creation interface provided by an embodiment of the present disclosure. The video creation interface includes: a description information input region 201 and a creation control 202, wherein, the description information input region 201 is used for inputting description information of the target video to be generated, and the creation control 202 is used for automatically generating the target video.

In some embodiments, the target user may input the description information of the target video in the description information input region 201, and then click the creation control 202, and the terminal 110 may send the description information inputted by the target user to the server 140 based on a click operation on the creation control 202 by the target user. For example, the terminal 110 may carry the description information inputted by the target user in a video generation request. In this way, the server 140 may acquire the description information of the target video to be generated.

In other embodiments, the target user may also directly click on the creation control 202 rather than input any description information in the description information input region 201. The terminal 110 may detect whether the inputted description information exists in the description information input region 201 based on the click operation on the creation control 202 by the target user; when it exists, the terminal 110 may send the inputted description information to the server 140; and when it does not exist, the terminal 110 may randomly generate the description information or generate the description information based on the historical description information, and then send the description information to the server 140. When the inputted description information does not exist in the description information input region 201, the terminal 110 may also send a video generation request without the description information to the server, and after the server 140 receives the video generation request without the description information, the server 140 randomly generates the description information or generates the description information based on historical description information, so that the server 140 may acquire the description information of the target video to be generated.

After the server 140 acquires the description information of the target video, it can acquire a target clip corresponding to the description information from the video material library based on the description information, then splice the target clip with each candidate clip of the plurality of candidate clips in the video material library to obtain a plurality of candidate videos, and finally score the candidate videos and generate a target video with a higher score based on the scores of the candidate videos. For example, one target video with the highest score may be generated, or a plurality of target videos with the top N scores may be generated, wherein, N is the number of target videos.

As can be seen, through the video generation system for video creation, a large amount of manual operations can be simplified, the difficulty of creating the video can be reduced, the needs of the user can be satisfied, and the completion rate, the amount of play, etc. of the target video can be further ensured, and the enthusiasm of the user for creating the video is improved.

In order to make the technical solution of the present disclosure clearer and easier to understand, the video generation method provided by the embodiment of the present disclosure is introduced from the perspectives of the terminal 110, the terminal 120, the terminal 130 and the server 140.

Figure 3:
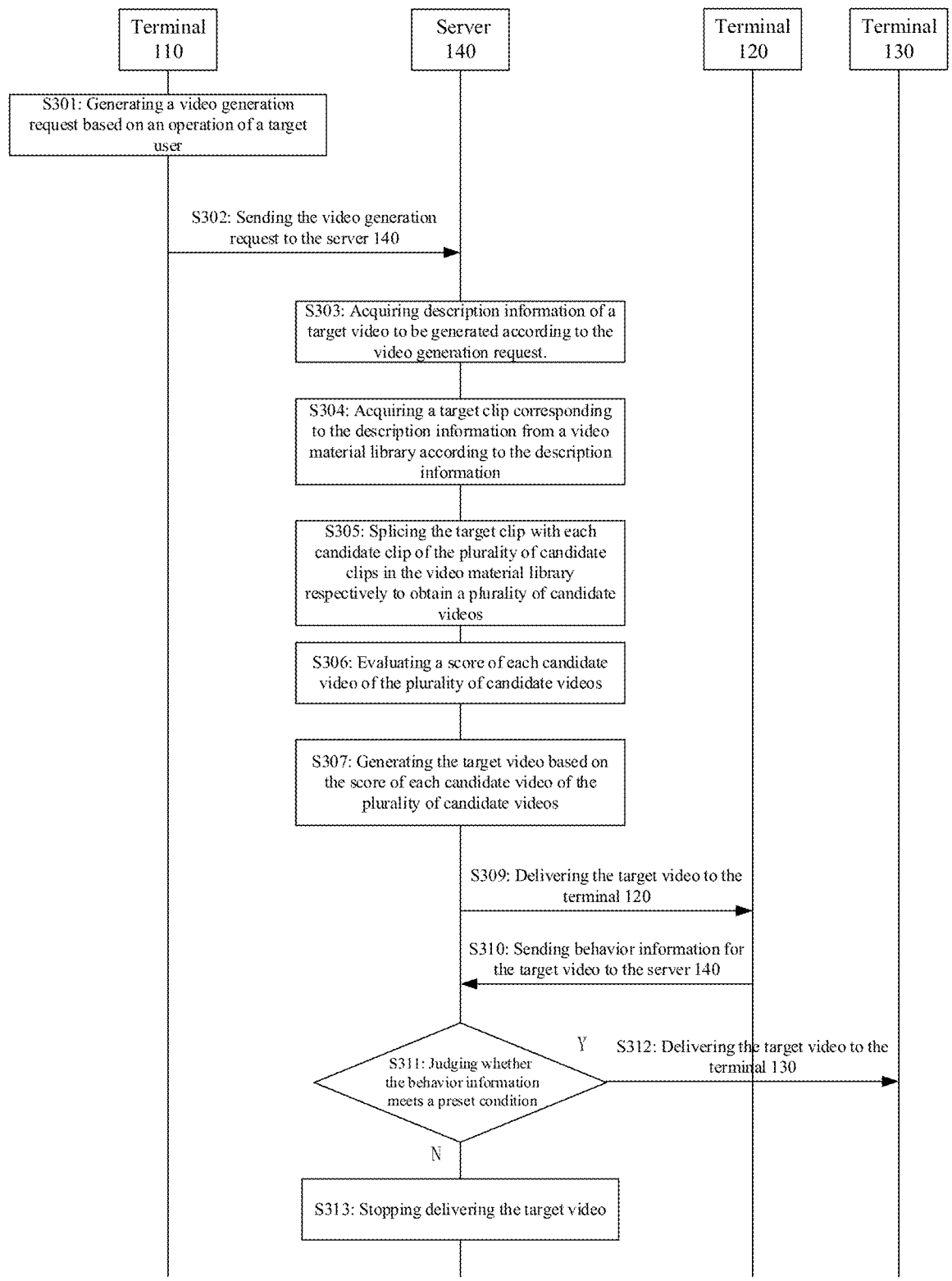
FIG. 3 is a flowchart of a video generation method provided by an embodiment of the present disclosure.

As shown in FIG. 3, it is a video generation method provided by an embodiment of the present disclosure, and the video generation method includes the following steps.

S301: the terminal 110 generating a video generation request based on an operation of a target user.

S302: the terminal 110 sending the video generation request to the server 140.

In some examples, the terminal 110 may present a video creation interface to the target user. As shown in FIG. 2, the target user clicks on the creation control 202 of the video creation interface, and then the terminal 110 may acquire the operation of the target user. Then, based on this operation, the video generation request is generated. When description information inputted by the target user exists in the description information input region 201, the terminal 110 may carry the description information inputted by the target user in the video generation request.

In some embodiments, the description information inputted by the target user in the description information input region 201 may be a script, a topic, a film title, an action, etc. The script includes characters and lines (such as what the characters say), so that the server 140 may retrieve video clips corresponding to the script from the video material library, and then splice the video clips to obtain the target video. The topic includes economy, science and technology, etc. The server 140 may retrieve video clips (such as videos of ships, videos of ports and videos of robots) corresponding to the topic from the video material library, and then splice the video clips to obtain the target video. The film title may be a name of a film and television drama, etc. The server 140 may intercept highlights in the film and television drama and then splice the highlights to obtain the target video. The action may be a classic action of a character in a film and television drama, and the server 140 may retrieve video clips corresponding to the action in the video material library, and then splice the video clips to obtain the target video. Further, the server 140 may also add a target user video uploaded by the target user in a process of splicing video clips, which will be introduced in detail later.

In other examples, when description information inputted by the target user does not exist in the description information input region 201, the terminal 110 may randomly generate the description information or generate the description information based on historical description information, and then carry the generated description information in the video generation request. Certainly, the terminal 110 may not generate the description information, and after the server 140 parses the video generation request, the server 140 randomly generates the description information or generates the description information based on historical description information.

The historical description information may be description information historically inputted by the target user, and generating the description information based on the historical description information may be generating description information with high similarity to the historical description information. The present disclosure is not limited to this, and those skilled in the art may choose an appropriate way to generate the description information according to actual requirements.

S303: the server 140 acquiring description information of a target video to be generated according to the video generation request.

As described above, the server 140 may parse the video generation request after receiving the video generation request. When the terminal 110 carries description information of the target video in the video generation request, the server 140 may acquire the description information of the target video to be generated from the video generation request. When the terminal 110 does not carry description information of the target video in the video generation request, the server 140 may randomly generate the description information or generate the description information based on historical description information. In this way, the server 140 can obtain the description information of the target video to be generated.

S304: the server 140 acquiring a target clip corresponding to the description information from a video material library according to the description information.

The video material library may be obtained based on historical videos, and the historical videos may be all types of videos, such as an entertainment video, a game video, a beauty video, a teaching video, an explanation video, etc.

Figure 4:
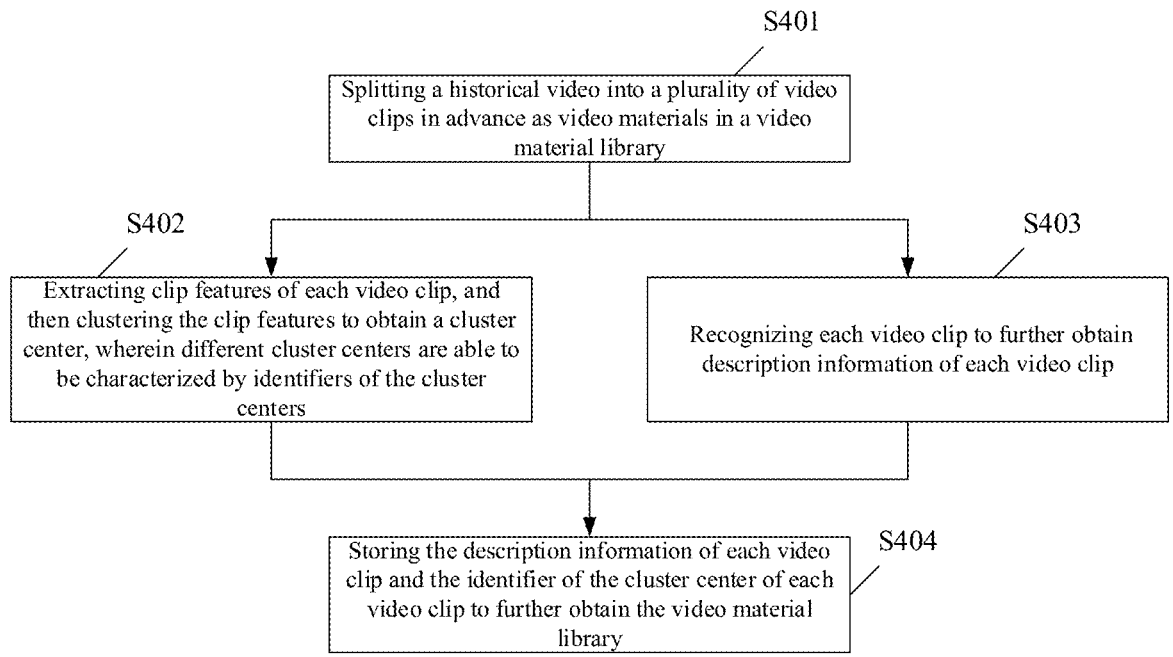
FIG. 4 is a schematic diagram for processing a historical video provided by an embodiment of the present disclosure.

As shown in FIG. 4, this diagram is a schematic diagram for processing a historical video provided by the present disclosure.

S401: splitting a historical video into a plurality of video clips in advance as video materials in a video material library.

In some examples, the historical video may be semantically split. For example, based on an automatic speech recognition (ASR) technology, the historical video may be speech-recognized, and then a corresponding text of the historical video can be obtained. The text includes a plurality of sentences and punctuations between sentences (for example, a comma, a full stop, a semicolon, etc.), and time stamps corresponding to the punctuations on the video may be used as splitting points. After the splitting points are determined, the time stamps are determined, then the video is split based on the time stamps, and then a plurality of video clips are obtained. In some examples, the time stamp corresponding to the full stop on the video may also be used as a splitting point, so that the historical video is split based on the splitting point corresponding to the full stop, which can further ensure the semantic coherence of each obtained video clip, thus solving the problem of poor quality of individual video clip.

S402: extracting clip features of each video clip, and then clustering the clip features to obtain a cluster center, wherein different cluster centers are able to be characterized by identifiers of the cluster centers.

The above-mentioned clip feature may be a text feature, an image feature, or a fusion feature after the fusion of the text feature and the image feature. In some examples, the text feature may be a BERT (Bidirectional Encoder Representations from Transformers) feature, and the image feature may be a CV (computer vision) feature. The above-mentioned clip feature may be represented by embedding.

S403: recognizing each video clip to further obtain description information of each video clip (such as video tag, keyword, etc.).

In some examples, motion recognition may be performed on each video clip to further obtain description information of each video clip, such as applauding, smiling and running. In other examples, face recognition may be performed on each video clip to further obtain description information of each video clip, such as a person 1. In other examples, scene recognition may be performed on each video clip to further obtain description information of each video clip, such as geographical location and scenery.

It should be noted that the implementation of the present disclosure does not limit the execution order of S402 and S403, and in other examples, S403 may be executed first, then S402, or both S402 and S403 may be executed at the same time.

S404: storing the description information of each video clip and the identifier of the cluster center of each video clip to further obtain the video material library.

For each video clip, there is the identifier and description information of the cluster center corresponding to the video clip; wherein, the description information is used for the target user to search the video clips through the terminal 110, and the identifier of the cluster center is used for the server 140 to retrieve the video clips from the video material library.

In some embodiments, it is also possible to score the video clips in the video material library, and then rank the videos in the video material library based on scores, for example, the video clip with a higher score is ranked top. In some examples, scoring may be based on the click-through rate of the video clip.

In some examples, after the server acquires the description information of the target video to be generated, the target clip corresponding to the description information may be acquired from video materials based on the description information. For example, the identifier of the cluster center corresponding to the target video is acquired based on the description information; and then based on the identifier of the cluster center, the video clip corresponding to the identifier is retrieved from the video material library as the target clip.

S305: the server 140 splicing the target clip with each candidate clip of the plurality of candidate clips in the video material library respectively to obtain a plurality of candidate videos.

In some embodiments, the server 140 may obtain a plurality of candidate videos based on a search method of a Monte Carlo tree. For example, the target clip is used as a root node to search the video material library, and each node corresponds to one video clip in the video material library; wherein, a searching process of the Monte Carlo tree includes: selection, node expansion and backpropagation, which are introduced respectively below.

Selection: a node to be searched may be selected by the way of an upper confidence bound (UCB) algorithm. Specifically, the node to be searched may be determined by the following equation:

$$a^k = \arg\max_a \left[ Q(s,a) + R(s,a) \cdot \frac{\sqrt{\sum_b N(s,b)}}{1+N(s,a)} \left(c_1 + \log\left(\frac{\sum_b N(s,b) + c_2 + 1}{c_2}\right)\right) + C(s,a) \cdot \frac{\sqrt{\sum_b N(s,b)}}{1+N(s,a)} \left(c_1 + \log\left(\frac{\sum_b N(s,b) + c_3 + 1}{c_3}\right)\right) \right] \quad (1)$$

Among them, $c_1$, $c_2$ and $c_3$ control different prior weights respectively; a and b represent child nodes of the node 5; $a^k$ represents that the node a is an optimal child node of the node s; k represents a number of layers in a current tree; N(s,a) represents a number of times to visit the node a; N(s,b) represents a number of times to visit the node b; R(s,a) represents a first evaluation value of the node a (for example, which may be characterized by CTR); C(s,a) represents a second evaluation value of the node a (for example, which may be characterized by a score of semantic coherence); and Q(s,a) represents a average value of the first evaluation value of the node a and the second evaluation value of the node a.

Node expansion: when the node to be searched is a leaf node, node expansion is performed, that is, a new node is added under the leaf node. Corresponding to the embodiment of the present disclosure, the node expansion of the root node may be splicing the target clip with the plurality of candidate clips in the video material library, and the plurality of child nodes obtained after the expansion of the root node may be a plurality of candidate videos.

Figure 5:
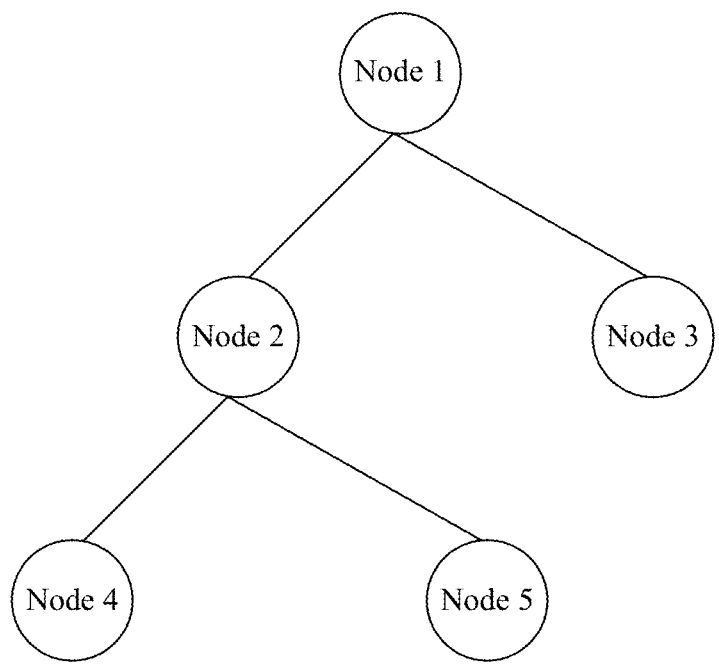
FIG. 5 is a schematic diagram of a Monte Carlo tree provided by an embodiment of the present disclosure.

As shown in FIG. 5, it is a schematic diagram of a Monte Carlo tree provided by an embodiment of the present disclosure. Node 1 is a root node, and the node 1 corresponds to the target clip; nodes 2 and 3 are new nodes obtained by node expansion of the node 1; and similarly, nodes 4 and 5 are new nodes obtained by node expansion of node 2. Each node corresponds to one video clip. As shown in FIG. 5, node 1-node 2-node 4 may correspond to one candidate video, node 1-node 2-node 5 may also correspond to one candidate video, and node 1-node 3 may also correspond to one candidate video.

Backpropagation: after a node expansion is completed, data of each node is updated. For example, the above-mentioned Q(s,a), R(s,a), C(s,a), N(s,a) and N(s,b) are updated.

Certainly, in other embodiments, the target user may upload a target user video, such as a video shot by the target user or a video stored in the terminal 110. Then, the server 140 splices the target user video with the obtained candidate videos to obtain spliced candidate videos. In some examples, the target user video may be spliced to a start position of the candidate video, a middle position of the candidate video, or an end position of the candidate video.

S306: the server 140 evaluating a score of each candidate video of the plurality of candidate videos.

The candidate video is obtained by splicing the plurality of video clips, and each video clip has an identifier of a cluster center corresponding to the video clip. Based on this, each candidate video may be characterized by an identifier sequence.

In some embodiments, after the identifier sequence of each candidate video is determined, each candidate video may be scored through a pre-trained evaluation model. For example, the identifier sequence of each candidate video is inputted to the evaluation model, and the evaluation model outputs the score of each candidate video; wherein, a scoring process may be based on semantic coherence, CTR, etc. of the candidate video.

Certainly, in other embodiments, after the target user video is spliced with the plurality of candidate videos, the spliced candidate videos may also be scored.

S307: the server 140 generating the target video based on the score of each candidate video of the plurality of candidate videos.

In some embodiments, a candidate video with the highest score may be selected as the target video from the plurality of candidate videos, and a plurality of candidate videos with the top N scores may also be selected as the target videos from the plurality of candidate videos. The embodiment of the present disclosure does not limit this, and those skilled in the art may choose to generate one target video or multiple target videos according to actual requirements. After the target video is obtained, other candidate videos are removed from the plurality of candidate videos.

S309: the server 140 delivering the target video to the terminal 120.

S310: the terminal 120 sending behavior information for the target video to the server 140.

The terminal 120 is a terminal with a first user range, and the number of users within the first user range is lower than a preset number, that is, the number of users within the first user range is small. The server 140 first delivers the target video to the first user range. Behavior information of users within the first user range with respect to the target video is acquired, wherein the behavior information includes a completion rate and/or a playing duration, and the behavior information may also be characterized by a like behavior, a forwarding behavior, viewing information, a click behavior and the like.

S311: the server 140 judging whether the behavior information meets a preset condition; if yes, S312 is executed; and if not, S313 is executed.

Behavior information meeting the preset condition may be that the completion rate is greater than a first preset threshold and/or the playing duration is greater than a second preset threshold. In this way, when the completion rate is greater than the first preset threshold, it indicates that the feedback of users within the first user range to the target video is good; similarly, when the playing duration is greater than the second preset threshold, it indicates that the feedback of users within the first user range to the target video is good.

S312: the server 140 delivering the target video to the terminal 130.

The terminal 130 is a terminal with the second user range, and the number of users within the second user range is higher than a preset number, that is, the number of users within the second user range is large. Moreover, the number of users within the second user range is higher than the number of users within the first user range.

When the behavior information of users within the first user range with respect to the target video meets the preset condition, it indicates that the feedback of users within the first user range with respect to the target video is good, that is, the effect of small flow delivery is good. Then, the target video is delivered within the second user range, that is, the target video is delivered with large flow, so that a better delivery effect can be achieved and the waste of resources required for video delivery may be reduced.

S313: the server 140 stopping delivering the target video.

When the behavior information of users within the first user range with respect to the target video does not meet the preset condition, it indicates that the feedback of users within the first user range to the target video is poor, that is, the effect of small flow delivery is poor. Then, no large flow delivery is performed any more, thus reducing the waste of resources required for video delivery.

In some embodiments, the server 140 may also receive adjustment information of a target user with respect to the target video, so as to adjust the target video according to the adjustment information, and then deliver the target video with small flow again. When the effect of small flow delivery is good, then large flow delivery is performed; and when the effect of small flow delivery is poor, then large flow delivery is not performed.

Based on the described above, the embodiment of the present disclosure provides a video generation method, including: firstly, acquiring the description information of a target video to be generated; then acquiring, from a video material library, a target clip corresponding to the description information based on the description information of the target video; and splicing the target clip with each candidate clip of a plurality of candidate clips in the video material library, thereby obtaining a plurality of candidate videos; then, evaluating the plurality of candidate videos respectively to obtain a score of each candidate video of the plurality of candidate videos, and obtaining the target video based on the scores. For example, the candidate videos with the top 3 scores may be used as the target videos. It can be seen that in this method, the target video can be generated without complicated operations by the user such as editing and splicing the original video, so that the operations of the user are simplified and the difficulty of creating the video is reduced.

Figure 6:
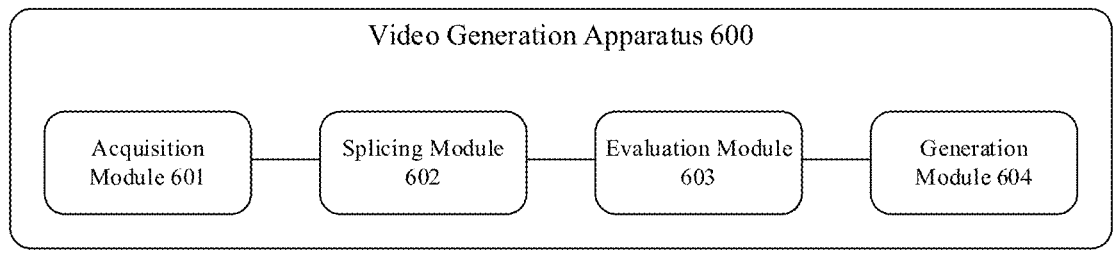
FIG. 6 is a schematic diagram of a video generation apparatus provided by an embodiment of the present disclosure.

FIG. 6 is a schematic diagram of a video generation apparatus illustrated according to an exemplary disclosed embodiment. As shown in FIG. 6, the video generation apparatus 600 includes:

- an acquisition module 601, configured to acquire description information of a target video to be generated, and acquire a target clip corresponding to the description information from a video material library according to the description information of the target video;
- a splicing module 602, configured to splice the target clip with each candidate clip of the plurality of candidate clips in the video material library respectively to obtain a plurality of candidate videos;
- an evaluation module 603, configured to evaluate a score of each candidate video of the plurality of candidate videos; and
- a generation module 604, configured to generate the target video according to the score of each candidate video of the plurality of candidate videos.

Optionally, the evaluation module 603 is specifically configured to evaluate the score of each candidate video of the plurality of candidate videos based on semantic continuity of adjacent clips of each candidate video and/or a click-through rate of each clip.

Optionally, the acquisition module 601 is specifically configured to acquire description information inputted by a target user for the target video to be generated.

Optionally, the description information is generated randomly or generated based on historical description information.

Optionally, the acquisition module 601 is further configured to acquire a target user video of the target user;
- the splicing module 602 is further configured to splice the target user video with the plurality of candidate videos respectively to obtain spliced candidate videos;
- the evaluation module 603 is specifically configured to evaluate scores of the spliced candidate videos; and
- the generation module 604 is specifically configured to generate the target video according to the scores of the spliced candidate videos.

Optionally, the apparatus further includes a delivery module;
- the delivery module is configured to deliver the target video within a first user range;
- the acquisition module 601 is further configured to acquire behavior information of a user within the first user range with respect to the target video;
- the delivery module is further configured to deliver the target video within a second user range when the behavior information meets a preset condition;
- wherein the number of users within the first user range is less than the number of the users within the second user range.

Optionally, the behavior information includes a completion rate and/or a playing duration, and the preset condition includes that the playing completion rate is greater than a first preset threshold and/or the playing duration is greater than a second preset threshold.

Optionally, the acquisition module 601 is further configured to receive adjustment information of a target user with respect to the target video, and adjust the target video according to the adjustment information.

The functions of the above-mentioned modules have been elaborated in the method steps in the previous embodiment, and are not described here again.

Figure 7:
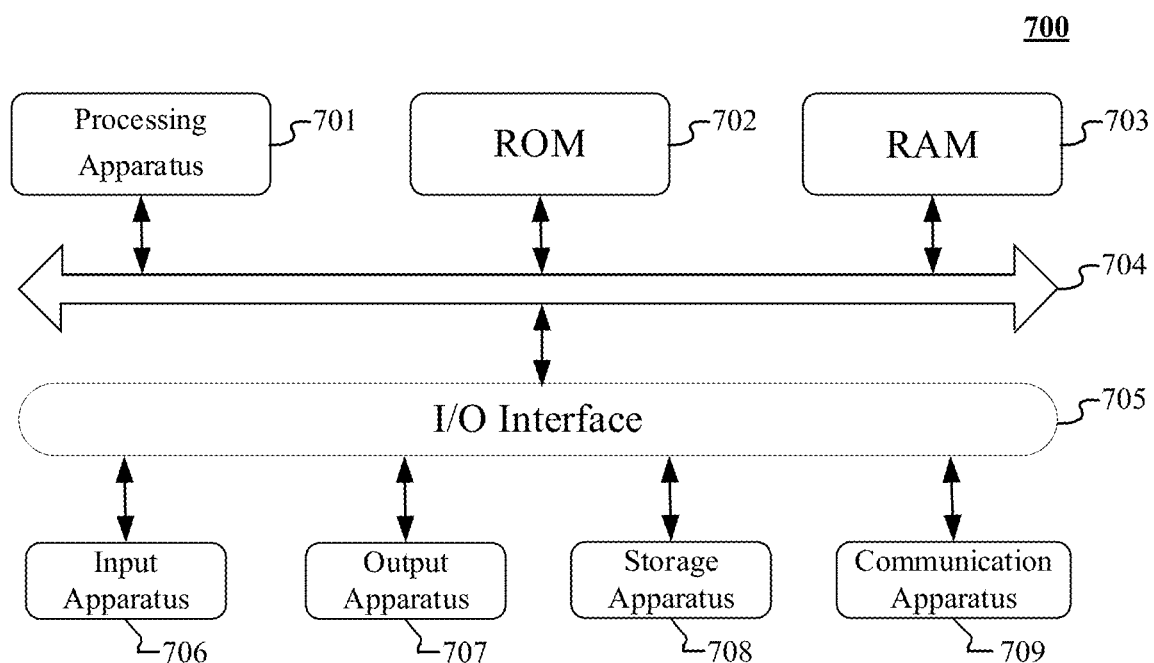
FIG. 7 is a schematic structural diagram of an electronic device provided by an embodiment of the present disclosure.

Reference is now made to FIG. 7, which shows a structural schematic diagram of an electronic device 7 suitable for implementing the embodiment of the present disclosure. The electronic device shown in FIG. 7 is only an example, and should not bring any limitation to the functions and application scope of the embodiments of the present disclosure.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the terminal and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire description information of a target video to be generated; according to the description information of the target video, acquire, from a video material library, a target clip corresponding to the description information; splice the target clip with each candidate clip of a plurality of candidate clips in the video material library respectively to obtain a plurality of candidate videos; evaluate a score of each candidate video of the plurality of candidate videos; and generate the target video according to the score of each candidate video of the plurality of candidate videos.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. Among them, the name of the module or unit does not constitute a limitation of the unit itself under certain circumstances. For example, the first acquisition module may also be described as "a module for acquiring at least two Internet protocol addresses".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides a document search method, including: acquiring description information of a target video to be generated; according to the description information of the target video, acquiring, from a video material library, a target clip corresponding to the description information; splicing the target clip with each candidate clip of a plurality of candidate clips in the video material library respectively to obtain a plurality of candidate videos; evaluating a score of each candidate video of the plurality of candidate videos; and generating the target video according to the score of each candidate video of the plurality of candidate videos.

According to one or more embodiments of the present disclosure, Example 2 provides the method of Example 1, and evaluating the score of each candidate video of the plurality of candidate videos includes:

evaluating the score of each candidate video of the plurality of candidate videos based on semantic continuity of adjacent clips of each candidate video and/or a click-through rate of each clip.

According to one or more embodiments of the present disclosure, Example 3 provides the method of Example 1 or 2, and obtaining the description information of the target video to be generated includes:

acquiring description information inputted by a target user for the target video to be generated.

According to one or more embodiments of the present disclosure, Example 4 provides the method of Example 1 or 2, and the description information is generated randomly or generated based on historical description information.

According to one or more embodiments of the present disclosure, Example 5 provides the methods of Examples 1-4, which further includes:

acquiring a target user video of the target user; and splicing the target user video with the plurality of candidate videos respectively to obtain spliced candidate videos.

Evaluating the score of each candidate video of the plurality of candidate videos includes:

evaluate scores of the spliced candidate videos.

Generating the target video according to the score of each candidate video of the plurality of candidate videos includes:

generating the target video according to the scores of the spliced candidate videos.

According to one or more embodiments of the present disclosure, Example 6 provides the methods of Examples 1 to 5, which further includes:

delivering the target video within a first user range and acquiring behavior information of a user within the first user range with respect to the target video;

when the behavior information meets a preset condition, delivering the target video within a second user range;

wherein a number of the user within the first user range is less than a number of users within the second user range.

According to one or more embodiments of the present disclosure, Example 7 provides the method of Example 6, wherein the behavior information includes a completion rate and/or a play duration, and the preset condition includes that the completion rate is greater than a first preset threshold and/or the play duration is greater than a second preset threshold.

According to one or more embodiments of the present disclosure, Example 8 provides the methods of Examples 1-7, which further includes:

receiving adjustment information of a target user with respect to the target video; and adjusting the target video according to the adjustment information.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A video generation method, comprising:

acquiring description information of a target video to be generated;

acquiring, from a plurality of video clips in a video material library, a target clip corresponding to the description information according to the description information of the target video, wherein the plurality of video clips have corresponding description information;

determining a plurality of candidate clips based on the target clip and the plurality of video clips;

splicing the target clip with each candidate clip of the plurality of candidate clips respectively to obtain a plurality of candidate videos;

evaluating a score of each candidate video of the plurality of candidate videos; and generating the target video according to the score of each candidate video of the plurality of candidate videos.

2. The method according to claim 1, wherein evaluating the score of each candidate video of the plurality of candidate videos comprises:

evaluating the score of each candidate video of the plurality of candidate videos based on semantic continuity of adjacent clips of each candidate video and/or a click-through rate of each clip.

3. The method according to claim 1, wherein acquiring the description information of the target video to be generated comprises:

acquiring description information inputted by a target user for the target video to be generated.

4. The method according to claim 1, wherein the description information is generated randomly or generated based on historical description information.

5. The method according to claim 1, wherein the method further comprises:

acquiring a target user video of a target user; and splicing the target user video with the plurality of candidate videos respectively to obtain spliced candidate videos;

evaluating the score of each candidate video of the plurality of candidate videos comprises:

evaluating scores of the spliced candidate videos; and generating the target video according to the score of each candidate video of the plurality of candidate videos comprises:

generating the target video according to the scores of the spliced candidate videos.

6. The method according to claim 1, wherein the method further comprises:

delivering the target video within a first user range and acquiring behavior information of a user within the first user range with respect to the target video;

when the behavior information meets a preset condition, delivering the target video within a second user range;

wherein a number of the user within the first user range is less than a number of users within the second user range.

7. The method according to claim 6, wherein the behavior information comprises a completion rate and/or a play duration, and the preset condition comprises that the completion rate is greater than a first preset threshold and/or the play duration is greater than a second preset threshold.

8. The method according to claim 1, wherein the method further comprises:

receiving adjustment information of a target user with respect to the target video; and adjusting the target video according to the adjustment information.

9. The method according to claim 2, wherein acquiring the description information of the target video to be generated comprises:

acquiring description information inputted by a target user for the target video to be generated.

10. The method according to claim 2, wherein the description information is generated randomly or generated based on historical description information.

11. The method according to claim 2, wherein the method further comprises:

acquiring a target user video of a target user; and splicing the target user video with the plurality of candidate videos respectively to obtain spliced candidate videos;

evaluating the score of each candidate video of the plurality of candidate videos comprises:

evaluating scores of the spliced candidate videos; and generating the target video according to the score of each candidate video of the plurality of candidate videos comprises:

generating the target video according to the scores of the spliced candidate videos.

12. The method according to claim 5, wherein the method further comprises:

delivering the target video within a first user range and acquiring behavior information of a user within the first user range with respect to the target video;

when the behavior information meets a preset condition, delivering the target video within a second user range;

wherein a number of the user within the first user range is less than a number of users within the second user range.

13. The method according to claim 5, wherein the method further comprises:

receiving adjustment information of a target user with respect to the target video; and adjusting the target video according to the adjustment information.

14. The method according to claim 6, wherein the method further comprises:

receiving adjustment information of a target user with respect to the target video; and adjusting the target video according to the adjustment information.

15. An electronic device, comprising:

a storage apparatus storing a computer program; and a processing apparatus, configured to execute the computer program on the storage apparatus to implement the method according to claim 1.

16. The electronic device according to claim 15, wherein evaluating the score of each candidate video of the plurality of candidate videos in the method comprises:

evaluating the score of each candidate video of the plurality of candidate videos based on semantic continuity of adjacent clips of each candidate video and/or a click-through rate of each clip.

17. The electronic device according to claim 15, wherein the method further comprises:

acquiring a target user video of a target user; and splicing the target user video with the plurality of candidate videos respectively to obtain spliced candidate videos;

evaluating the score of each candidate video of the plurality of candidate videos comprises:

evaluating scores of the spliced candidate videos; and generating the target video according to the score of each candidate video of the plurality of candidate videos comprises:

generating the target video according to the scores of the spliced candidate videos.

18. The electronic device according to claim 15, wherein the method further comprises:

delivering the target video within a first user range and acquiring behavior information of a user within the first user range with respect to the target video;

when the behavior information meets a preset condition, delivering the target video within a second user range;

wherein a number of the user within the first user range is less than a number of users within the second user range.

19. The electronic device according to claim 18, wherein the behavior information comprises a completion rate and/or a play duration, and the preset condition comprises that the completion rate is greater than a first preset threshold and/or the play duration is greater than a second preset threshold.

20. A non-transitory computer-readable storage medium, wherein a computer program is stored on the non-transitory computer-readable medium, and when the computer program is executed by a processing apparatus, the method according to claim 1 is implemented.

* * * * *